(12) United States Patent
Wiegmann

(10) Patent No.: US 11,657,228 B2
(45) Date of Patent: May 23, 2023

(54) RECORDING AND ANALYZING USER INTERACTIONS FOR COLLABORATION AND CONSUMPTION

(71) Applicant: SAP SE, Walldorf (DE)

(72) Inventor: Sascha Wiegmann, Uetze (DE)

(73) Assignee: SAP SE, Walldorf (DE)

( * ) Notice: Subject to any disclaimer, the term of this patent is extended or adjusted under 35 U.S.C. 154(b) by 244 days.

(21) Appl. No.: 16/452,753

(22) Filed: Jun. 26, 2019

(65) Prior Publication Data
US 2020/0410052 A1 Dec. 31, 2020

(51) Int. Cl.
*G06F 40/295* (2020.01)
*G06V 30/40* (2022.01)

(52) U.S. Cl.
CPC ........... *G06F 40/295* (2020.01); *G06V 30/40* (2022.01)

(58) Field of Classification Search
CPC . G06F 40/295; G06F 40/169; G06K 9/00442; G06K 2209/01; G06K 2209/27
See application file for complete search history.

(56) References Cited

U.S. PATENT DOCUMENTS

| 7,945,566 B2 | 5/2011 | James et al. |
| 8,352,411 B2 | 1/2013 | Schmidt et al. |
| 8,488,916 B2 | 7/2013 | Terman |
| 9,442,930 B2 | 9/2016 | Szucs et al. |
| 10,445,051 B1 * | 10/2019 | Subash ............... G06F 3/04842 |
| 2007/0016563 A1 | 1/2007 | Omoigui |
| 2011/0035381 A1 * | 2/2011 | Thompson ............ G06F 16/951 707/740 |
| 2013/0121580 A1 * | 5/2013 | Chen .................... G06Q 10/063 382/182 |
| 2013/0136253 A1 * | 5/2013 | Liberman Ben-Ami .................... H04M 3/5191 379/265.09 |
| 2015/0081802 A1 * | 3/2015 | Borenstein ............ H04L 65/403 709/204 |
| 2015/0242104 A1 | 8/2015 | Stokman et al. |
| 2019/0384686 A1 * | 12/2019 | Estes ....................... G06F 16/93 |

* cited by examiner

*Primary Examiner* — Keith D Bloomquist
(74) *Attorney, Agent, or Firm* — Sterne, Kessler, Goldstein & Fox P.L.L.C.

(57) ABSTRACT

Disclosed herein are system, method, and computer program product embodiments for analyzing screen data to provide collaboration and consumption opportunities. An embodiment operates by receiving screen data of a visible portion of a display of a computer and metadata associated with the screen data. The screen data and the metadata are associated with a user. The embodiment extracts text from the screen data using optical character recognition. The embodiment identifies a topic associated with the screen data based on the extracted text. The embodiment stores a mapping between the topic and the user and the metadata in a database. The embodiment then provides information about the user based on the mapping.

23 Claims, 4 Drawing Sheets

RECORDING AND ANALYZING USER INTERACTIONS FOR COLLABORATION AND CONSUMPTION

BACKGROUND

A user in a business, organization, or entity often uses their computer nearly all day. The user may search for, view, or create various information. For example, the user may view a website, read an email, or write a document. The user often performs these actions for a topic. The user may perform the same or a similar topic as other users in the business, organization, or entity. The user may therefore benefit from the knowledge of these other users. For example, the user may want to connect with these users because they may be able to help the user complete their task. But the user often does not know about these other users. This is often the case in large businesses or organizations where users are separated by large distances or rigid organizational lines.

Conventional solutions are often unable to bring together users together based on what they are doing or working on. This is because conventional solutions often do not know about all the actions users are performing on their computers for a topic. Conventional solutions often capture only limited information about what a user is doing on their computer.

In addition, a user often wants to go "back in time" and see what actions they took as part of a topic. But conventional solutions are often unable to allow a user to go "back in time." Again, this is because conventional solutions often do not know about all the actions users are performing on their computers for a topic. Conventional solutions are therefore unable to reconstruct the actions the user performed in the past for a topic.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
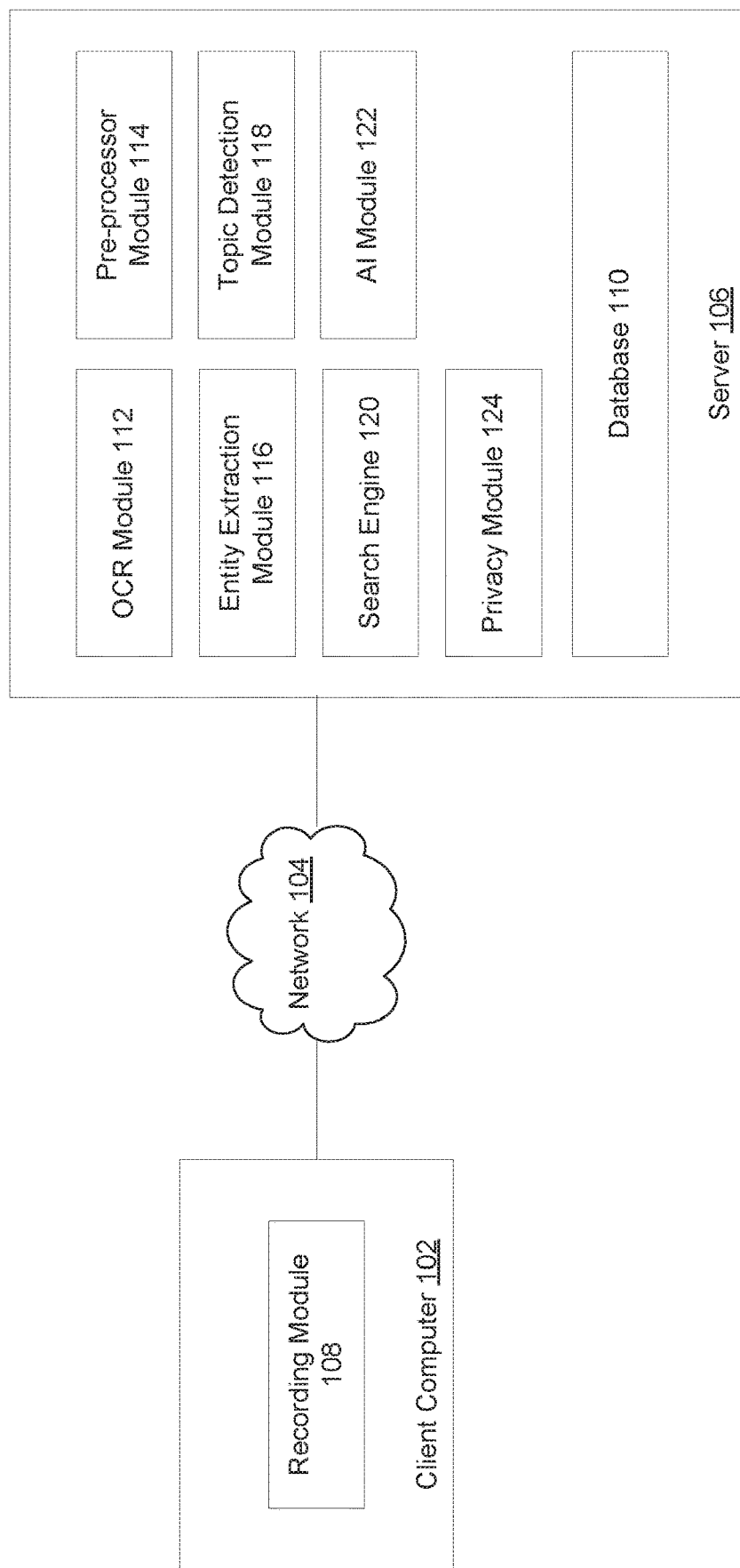
FIG. 1 is a block diagram of system for recording and analyzing user interactions for collaboration and consumption opportunities, according to some embodiments.

Provided herein are system, apparatus, device, method and/or computer program product embodiments, and/or combinations and sub-combinations thereof, for recording and analyzing user interactions to enable collaboration and consumption opportunities. For example, some embodiments involve recording the interactions of a user at a client computer to match the user with other users in the same business, organization, or entity engaged in the same or a similar topic. Some embodiments involve recording the interactions of a user at a client computer to allow the user to go "back in time" and see what actions they took for a topic.

A user in a business, organization, or entity often uses their computer nearly all day. The user may search for, view, or create various information. For example, the user may view a website, read an email, or write a document. The user often performs these actions for a topic. For example, an employee in human resources may perform employee benefits management. The employee may edit a spreadsheet to track employee benefits, write an email outlining benefit changes, and view a website explaining the benefits offered by a benefits provider.

A user may often be engaged in the same or a similar topic as other users in the same business, organization, or entity. For example, several employees in human resources may perform employee benefits management. A user performing benefits management may therefore benefit from the knowledge of another user who is engaged in benefits management. The user may want to connect with this other user because she may be able to help the user. But the user often does not know about these other users. This is often the case in large businesses or organizations where users are separated by large distances or rigid organizational lines.

But conventional solutions are often unable to bring together users together based on what they are doing or working on. This is because conventional solutions often do not know about all the actions users are performing on their computers for a topic. Conventional solutions often capture only limited information about what a user is doing on their computer.

In addition, a user often wants to go "back in time" and see what actions they took as part of a topic. But conventional solutions are often unable to allow a user to go "back in time." Again, this is because conventional solutions often do not know about all the actions users are performing on their computers for a topic. Conventional solutions are therefore unable to reconstruct the actions the user performed in the past for a topic.

Conventional solutions to these technical problems include building a search engine into an operating system. The search engine can index various files on a user's computer at periodic intervals. A user can then quickly search for documents, emails, or programs stored on the computer based on the indexed text. The indexed text can represent the topics engaged in by the user. But this conventional solution suffers from several problems.

First, the search engine can only index files stored on the user's computer. The search engine is unable to index files stored on another user's computer. Moreover, this conventional solution does not unify the indexed text from multiple computers in a centralized database. Therefore, because the indexed text from multiple computers is not stored in a centralized database, there is no way to identify users who perform the same or a similar topic.

Second, the search engine can only search index files. But users can search for, view, or create information that is never stored in files. For example, a user may view information (e.g., a webpage) in an application (e.g., a web browser). But the user may never save the information to their computer as a file. The information displayed in the application would therefore never be indexed by the search engine. The information displayed in the application would therefore not be available for later searching, let alone for analysis of the topics engaged in by the user. But this information may be highly relevant to the topics the user was engaged in. Without this information, it may be more difficult to identify users performing the same or similar topics. In addition, because this information is not indexed, the user is not able to go "back in time" and see what actions they took in the past for a topic.

Finally, the search engine often does not enable collaboration opportunities because it does not capture the context around how a user interacted with indexed files. The indexed information by itself does not include the context needed to link related users together. For example, the search engine may not track when the user was interacting with a file, what the user was doing when they interacted with the file, what program they were using to interact with the file, and/or whether the user was viewing or editing the file. But this context information is often highly relevant to identifying the topic being performed by the user. This context information is also highly relevant to identifying users performing the same or similar topics as the user.

Similarly, this context information is often necessary for the user to be able to go "back in time" and see what actions they took for a topic. This is because this context information enables the user to be placed in the same position they were in when they were previously interacting with the indexed information for a topic.

Other conventional solutions include recording what is occurring on a user's screen such as what program they are running or what document they are viewing. For example, screen recording is often used to create demo videos for training purposes. But conventional solutions using screen recording do not capture information identifying what is occurring in the captured screenshot. As a result, the captured screenshots provide very little information that can be used to automatically identify what the user was doing. In addition, conventional solutions using screen recording do not capture any context information around the captured screenshots. But this context information is often highly relevant to identifying the logical topic engaged in by the user in the captured screenshot. This context information is also highly relevant to identifying users engaged in the same or similar topics as the user. As a result, conventional solutions do not capture sufficient information to enable the identification of users engaged in the same or similar topics.

Other conventional solutions include matching users based on topic rules. These conventional solutions are based on static information. In other words, topic rules are established upfront before matching occurs. Moreover, the rules often need to be periodically updated. Because these conventional solutions do not continually refine and update the rules based on what users are actually doing each and every day, these conventional solutions do not accurately match users with other users engaged in the same or similar topics. In other words, users are often matched with other users who are not engaged in the same or similar topics.

Embodiments herein solve these technological problems by capturing what a user sees and does on their screen. For example, embodiments can capture what the user sees and does on their screen by creating a screenshot of the screen (or the application). Embodiments can also capture what the user sees and does on their screen by extracting data (e.g., text) from a displayed application without generating an image. As would be appreciated by a person of ordinary skill in the art, capturing screen data can refer to creating a screenshot of what the user sees and does on their screen, or extracting data from a displayed application without generating an image.

Embodiments then extract the text appearing in the captured screen data. Embodiments determine and associate relevant metadata with the captured screen data. Embodiments identify entities such as names and addresses in the extracted text. Embodiments then identify one or more topics associated with the captured screen data using the extracted text, entities, and or metadata. After identifying the topics, embodiments store the extracted text, metadata, captured screen data, and user information for the identified topic. Embodiments use this stored information to find users who are engaged in the same similar topics as a given user. This can enable the building of communities of similarly situated users, as well as enable users to find other users to help them. Finally, embodiments use this stored information to enable a user to go "back in time" and see out they handled a topic in the past.

FIG. 1 is a block diagram of a system 100 for recording and analyzing user interactions for collaboration and consumption opportunities, according to some embodiments. System 100 can include client computer 102 and server 106.

Client computer 102 can be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. Client computer 102 can be operated by a user of a business, organization, or other entity that is interested in collaborating with similarly situated users in the business, organization, or other entity.

Server 106 can be a dedicated server computer, a collection of server computers, or a cloud computing platform. Server 106 can receive captured screen data (e.g., one or more screenshots) corresponding to a visible portion of a display of client computer 102 over network 104. Network 104 can include, without limitation, wired and/or wireless intranet, extranet, Internet, cellular, Bluetooth and/or any other local, short range, ad hoc, regional, global communications network, as well as any combination thereof. Server 106 can then analyze the screen data to associate users by topic and enable users to find other users performing the same or similar topic or task. Server 106 can receive screen data from multiple client computers 102.

As would be appreciated by a person of ordinary skill in the art, the operations performed on client computer 102 and server 106 can be combined on the same computer or split among multiple computers Client computer 102 can record, in some embodiments, everything a user has done and seen on a display of client computer 102. In other words, client computer 102 can capture screen data. Client computer 102 can do this by periodically capturing screenshots (e.g., digital images) corresponding to a visible portion of a display of client computer 102. Client computer 102 can also capture what the user sees and does on their screen by extracting data (e.g., text) from a displayed application without generating an image. As would be appreciated by a person of ordinary skill in the art, client computer 102's capture of screen data can refer to creating a screenshot of what the user sees and does on their screen, or extracting data from a displayed application without generating an image.

Unlike indexing information in files, captured screen data captures most (if not all) information the user consumes, searches for, or creates because it takes a snapshot of exactly what the user sees on the display. Therefore, information that conventional solutions fail to capture is often captured in the captured screen data.

Client computer 102 can include a recording module 108. Recording module 108 can capture screen data (e.g., a screen shot) corresponding to a visible portion of the display of client computer 102. Recording module 108 can capture the entire screen that is presented to the user on the display of client computer 102. Recording module 108 can also capture a portion of the screen that is presented to the user on the display of client computer 102. For example, recording module 108 can capture screen data (e.g., a screenshot) corresponding to the active software application window (e.g., a web browser) on the display of client computer 102. As would be appreciated by a person of ordinary skill in the art, recording module 108 can capture various other portions of the screen that is presented to the user on the display of client computer 102.

Recording module 108 can capture screen data of the entire screen (or a visible portion of the screen) using an application programming interface (API) of the operating system. Recording module 108 can also capture screen data corresponding to an active software application window using a software hook into the active software application. As would be appreciated by a person of ordinary skill in the art, recording module 108 can capture screen data of the entire screen (or a visible portion of the screen) using various other techniques such as copying the frame buffer associated with the display of client computer 102.

In some embodiments, recording module 108 can capture screen data of the entire screen (or a visible portion of the screen) at all times. Recording module 108 can also capture screen data of the entire screen (or a visible portion of the screen) when recording module 108 is turned on by a user, system administrator, or policy rule.

A user can turn on or off recording module 108 using a switch in a user interface provided by recording module 108. A user may want to turn off recording module 108 when they are performing a private task using client computer 102. In this case, the user may not want system 100 to identify the topic they are working on for privacy reasons. A user may also want to turn off recording module 108 when they are engaged in a highly sensitive topic that should not be analyzed (e.g. reviewing a confidential client document).

A system administrator can also turn on or off recording module 108 using a switch in the user interface provided by recording module 108. A system administrator can also turn on or off recording module 108 by setting a policy rule for recording module 108. This may be useful in environments where the business, organization, or entity wants to ensure that recording module 108 is turned on for relevant users (e.g., human resource employees).

Recording module 108 can capture screen data (e.g., screenshots) of the entire screen (or a visible portion of the screen) at different frequencies. For example, recording module 108 can capture screen data of the entire screen (or a visible portion of the screen) every second. The higher the frequency of capture, the more accurate the subsequent analysis and matching performed by system 100 will likely be. This is because the higher frequency, the more likely changes to the screen (e.g., entering new text, displaying new information, displaying a different software application, etc.) will be captured via screen data. A user can adjust the frequency that recording module 108 captures screen data of the entire screen (or a visible portion of the screen). A system administrator can also adjust the frequency that recording module 108 captures screen data of the entire screen (or a visible portion of the screen). The system administrator may adjust the frequency based on storage space, network transmission cost, or processing time requirements as would be appreciated by a person of ordinary skill in the art.

Recording module 108 can store various metadata related to a captured screen data. This metadata can relate to the current activity of the user on client computer 102. This metadata can be used with the captured screen data to determine what topic a user is working on and enable the user to find other users engaged in the same or a similar topic.

Recording module 108 can capture various types of metadata. For example, recording module 108 can capture any combination of:

the date and time the associated screen data was captured;
the name of the user using client computer 102 when the associated screen data was captured;
the name of the program running in the foreground of the screen (e.g., the active software application) when the associated screen data was captured;
the filename and or title of the current object (e.g., a word processing document) that is visible on the screen when the associated screen data was captured;
the Internet uniform resource locator (URL) or tile of the current website visible on the screen when the associated screen data was captured;
how long the associated screen data was shown on the display of client computer 102; and/or
the type of document visible on the screen (e.g., a website, document, presentation, image, video, email, etc.) when the associated screen data was captured.

In addition, recording module 108 can capture other activity of the user at client computer 102 when the screen data was captured. For example, recording module 108 can capture whether the user was viewing information, typing on the keyword, or moving the mouse. Recording module 108 can capture other tasks the user was performing when the associated screen data was captured. For example, recording module 108 can capture whether the user was in a phone call when the associated screen data was captured. Recording module 108 can also capture what URLs, files, and or directories the user visited when the associated screen data was captured. Recording module 108 can capture various other types of information as would be appreciated by a person of ordinary skill in the art.

Recording module 108 can also receive metadata directly from the user. This metadata can be added to the other metadata associated with the screen data. For example, the user can manually add annotations to the associated screen data that was captured. The annotations can be used to analyze the associated screen data and match users with users engaged in the same or similar topics. These annotations can also enable a user to find topics they were previously engaged in (e.g., "Give me documents that I liked"). For example, the user can add text directly to the associated screen data that was captured using a user interface of recording module 108. The user can tag the associated screen data as a favorite by clicking a button in the user interface provided by recording module 108. For example, a favorite button may be overlaid on the associated screen data. The user can also rate the associated screen data using the user interface provided by recording module 108.

In some embodiments, recording module 108 can enable a user to add annotations to the associated screen data using speech. Recording module 108 can provide a conversational artificial intelligence (AI) interface for the user to add annotations to the associated screen data. For example, the user can say "This document is great" and the conversational AI interface can perform natural language processing and sentiment analysis on the voice input. Recording module 108 can then add the resulting annotation to the associated screen data. For example, recording module 108 can add a favorite tag to the associated screen data.

Recording module 108 can also analyze the captured metadata to derive additional metadata. Recording module 108 can analyze the automatically captured metadata and or the manually added annotation(s). Recording module 108 can analyze the metadata to determine if the user is consuming or creating information. For example, recording module 108 can analyze the metadata to determine if input devices (e.g., a mouse, keyword, stylus, etc.) were being used while a running program was in the foreground (e.g. presentation software). If so, recording module 108 can derive the additional metadata of creating or editing information of the foreground program type (e.g., editing a presentation). Recording module 108 can then associate this metadata with the screen data. Recording module 108 can also associate the duration and time of occurrence with this additional metadata.

Recording module 108 can also analyze automatically captured metadata to determine if input devices were being used to consume or view information. For example, recording module 108 can analyze the metadata for movements of the mouse scroll wheel while a running program was in the foreground (e.g., web browser). If so, recording module 108 can derive the additional metadata of viewing information (e.g., viewing website). Recording module 108 can then associate this metadata with the screen data. Recording module 108 can also associate the duration and time of occurrence with this metadata.

Recording module 108 can also take a snapshot of the file (PowerPoint, Word, etc.) that is being used in the captured screen data at the time of recording. This snapshot can be stored as part of the metadata associated with the screen data. This can enable the user to open the version of the file that existed at the time of the screen recording. As would be appreciated by a person of ordinary skill in the art, recording module 108 can take a snapshot of the file using the API of the operating system on client computer 102 or using various other techniques.

Client computer 102 can transmit the captured screen data together with the associated metadata to server 106 for processing. As they are generated, client computer 102 can continuously transmit the screen data, together with the associated metadata, to server 106 for processing. Client computer 102 can also wait to transmit several captured screen data items as a group to server 106 for processing.

Server 106 can receive the screen data together with the associated metadata from client computer 102 over network 104. Server 106 can then analyze the screen data to associate users by topic and enable users to find other users engaged in the same or similar topic. As would be appreciated, server 106 can receive screen data from multiple client computers 102. Server 106 can use the screen data to determine what topics different users are working on and to match users working on the same or similar topics.

Server 106 can include database 110, optical character recognition (OCR) module 112, pre-processing module 114, entity extraction module 116, topic detection module 118, search engine 120, AI module 122, and privacy module 124. Server 106 can store the received screen data together with the associated metadata in database 110. Server 106 can also process the screen data together with the associated metadata to identify what different users are working and enable the matching of users who are engaged in the same or similar topics.

As part of the processing, server 106 can use OCR module 112. OCR module 112 can be a software or hardware module that performs optical character recognition. OCR module 112 can receive captured screen data (e.g., a screenshot) from a client computer 102 and extract text in the captured screen data. For example, if the captured screen data is a screenshot of an email program displaying an email, OCR module 112 can extract the text in the displayed email. OCR module 112 can then output the extracted text. As would be appreciated by a person of ordinary skill in the art, OCR module 112 can use various optical character recognition techniques.

In some embodiments, server 106 can include pre-processor module 114. Pre-processor module 114 can pre-process the extracted text outputted by OCR module 112. This can improve the quality of the extracted text for the later topic identification and user matching. This is often necessary because the extracted text may contain irrelevant information. For example, pre-processor module 114 can remove punctuation, special symbols, stop words, and or numbers from the extracted text. Pre-processor module 114 can standardize the letter case of words. Pre-processor module 114 can reduce recognized words to their stem and or root form. Pre-processor module 114 can also remove sensitive words from the extracted text. As would be appreciated by a person of ordinary skill in the art, pre-processor module 114 can perform various other types of pre-processing.

In some embodiments, server 106 can include an entity extraction module 116 to process the extracted text (whether pre-processed or not). Entity extraction module 116 can identify text in the extracted text as representing certain entities (e.g., things, people, places, etc.) In other words, entity extraction module 114 can map a piece of text to a predefined category (e.g., an entity) to create additional metadata. For example, entity extraction module 116 can identify dates, software application names, document titles, persons, Internet addresses, and or email addresses in the extracted text. As part of identifying these entities, entity extraction module 116 can assign the piece of text an associated category (e.g., a person, Internet address, etc.) The assigned categories represent entities and can constitute additional metadata beyond the metadata received with the screen data. This metadata can relate to the activity occurring in the screen data (e.g., screenshot).

Entity extraction module 116 can identify entities using various techniques as would be appreciated by a person of ordinary skill in the art. For example, entity extraction module 116 can use entity extraction. Entity extract module 116 can map pieces of text to set of predefined entity categories. As would be appreciated by a person of ordinary skill in the art, new entity categories can be defined for mapping purposes. Entity extraction module 116 can then output this additional entity metadata for later analysis.

In some embodiments, server 106 can include topic detection module 118 to identify one or more topics associated with the received screen data. Topic detection module 118 can perform this identification using the extracted text from OCR module 112 (or the pre-processed text from pre-processing module 114), the metadata associated with the received screen data from client computer 102, and/or the additional entity metadata from entity extraction module 114. Topic detection module 118 can identify which topics the received screen data is associated with.

In some embodiments, topic detection module 118 can identify one or more topics associated with the received screen data using a two-step process. In the first step, topic detection module 118 can extract a list of the most informative keywords from the extracted text from OCR module 112 (or the pre-preprocessed text from pre-processing module 114). For example, topic detection module 118 can extract a list of the most informative keywords using a term frequency-inverse document frequency technique. As would be appreciated by a person of ordinary skill in the art, topic detection module 118 can extract the list of most informative keywords using various other numerical statistical methods. The result of the first step is a list of the most informative keywords for the extracted text (or pre-processed text), and therefore for the received screen data.

In the second step, topic detection module 118 can identify clusters of keywords from the most informative keywords in the first step that are representative of a topic. Topic detection module 118 can identify clusters of keywords that are representative of a topic using a induced bisection k-means algorithm. As would be appreciated by a person of ordinary skill in the art, topic detection module 118 can identify clusters of keywords that are representative of a topic using various other algorithms that calculate similarity or distance between words. Topic detection module 118 can then determine the most relevant topic for the cluster of keywords. Topic detection module 118 can then output the identified topics.

Server 106 can store the identified topics together with information about the user associated with the received screen data, the received screen data, the metadata associated with the received screen data from client computer 102, and or the metadata generated at server 106 (e.g., the entity metadata) in database 110. In other words, server 106 can store a mapping between the identified topics and the user in database 110. Database 110 can be a relational database, object oriented database, flat file database, or various other type of database would be appreciated by a person of ordinary skill in the art. As a result, database 110 can store knowledge about the user associated with the received screen data. This enables various consumption or collaboration opportunities.

For example, database 110 can store the topics the user worked on, together with metadata such as the duration the user worked on a topic, and whether the user created information or consumed information. The storage of this knowledge about the user enables other users to identify this user as an expert on a topic, enables the user to be matched with other users who work on the same or similar topics, and or enables the user to search and review how they tackled topics in the past.

Server 106 can use the knowledge about users in database 110 to enable different consumption or collaboration opportunities. In some embodiments, server 106 can use the knowledge about a user in database 110 to connect the user with other users who are working on the same or similar topics. As would be appreciated by a person of ordinary skill in the art, a topic can include, but is not limited to, the area the user is working in, the subject the user is working on, the task the user is working on, the working style of the user, the job type of the user, or the object (e.g., product, document, etc.) the user is working on. In other words, server 106 can identify the topic the user is working on at various levels of granularity. For example, server 106 can identify a topic a user is working on at a micro level such as "Who has knowledge in XYZ?" Server 106 can also identify and connect users on a macro level such as "Who in my company has a similar job as I?" Server 106 can also identify users based on their working style such as "Who else has the same working style as I have?" Server 106 can perform this identification by searching database 110 using search engine 120 and or AI module 122. This is possible because database 110 can map topics to users. Database 110 can also store metadata with the mappings which describes how users worked on topics (e.g., did they consume or create information), when they worked on topics, and or how long they worked on topics.

In some embodiments, server 106 can provide a user interface where a user can look for people associated with a particular topic. For example, server 106 can provide a web user interface to a user at a client computer 102 to search for people who are experts in a particular topic. Server 106 can receive a search request from the user for users who are associated with a particular topic. Server 106 can receive the request as a text input. Server 106 can also receive the request as a voice input. Server 106 can receive various other search parameters with the request. The search parameters can include the distance to search for users, what organization to search in, how long potential users have been in the organization, the job title or role of potential users, whether to limit the search to users who are actively working on a topic, and various other search parameters as would be appreciated by a person of ordinary skill in the art. Server 106 can then use search engine 120 to search database 110 for people who engage in the particular topic specified by the search request.

In some embodiments, instead of a user explicitly searching for people who are experts in a particular topic, server 106 can receive a request from a user for people who engage in the same or similar topics as the user who is submitting the search request. Search engine 120 can narrow the search based on search parameters provided by the user. For example, search engine 120 can narrow the search to people actively working on the same or a similar topic as opposed to users who worked on such topic in the past. Search engine 120 can then search database 110 for users who are working on the same or similar topic as the user who submitted the search request. Search engine 120 can compare information of the user who submitted the request (e.g., the topics associated with the user in database 110) with the information of other users in database 110 (e.g., the topics associated with other users in database 110). Search engine 120 can perform the comparison using various database search techniques as would be appreciated by a person of ordinary skill in the art.

In response to a search request, search engine 120 can return a list of the top N people who are closest (e.g., in terms of the work they do) to the requested search parameters. This can be the top N people who engage in a particular topic requested by a user. This can also be the top N people who are engaged in the same or similar topic as the user who submitted the search request. Search engine 120 can provide the search results in various formats. For example, search engine 120 can provide the names of top N users. Search engine 120 can also provide the topics that the top N users and the current user have in common. As would be appreciated by a person of ordinary skill in the art, a system administrator or a user can customize what is shown in the search results as well as the number of search results. For example, the user can browse and navigate through the search results using a social network style user interface.

Search engine 120 can further rank the search results based on criteria like location, distance between users, presence of a previous interaction between the users, and/or various other criteria as would be appreciated by a person of ordinary skill.

In some embodiments, server 106 can use AI module 122 to provide recommendations to a user of users engaged in the same or similar topics as the user without requiring the user to specifically issue a search request. For example, a user who is looking at a certain Portable Document Format (PDF) whitepaper on client computer 102 can speak "I need help with this document" at client computer 102. Alternatively, the user can click a button indicating they do not understand the PDF whitepaper. The user's indication that they do not understand the whitepaper can be stored as metadata with the screen data of the PDF whitepaper by recording module 108. Server 106 can receive the screen data of the PDF whitepaper and the associated metadata. AI module 122 can use this metadata indicating that the user does not understand the whitepaper to trigger finding users doing similar work as the user who does not understand the whitepaper. In other words, the "I need help with this document" metadata can automatically trigger AI module 122 to identify users engaged in the same or similar topics as the user without requiring the user to specifically issue a search request. In response, AI module 122 can identify other users in database 110 who looked at the same whitepaper, viewed or created another document about the same or a similar topic as the whitepaper, marked the whitepaper as a favorite, wrote articles about the same or a similar topic associated with the whitepaper, or asked someone in an email about the topic of whitepaper and received an explanation. AI module 122 can return search results (e.g., a list of recommended users) to the user at client computer 102.

AI module 122 can tailor the search results based on various criteria. For example, AI module 122 can list recommended users by who is closest to the user being provided the recommendations, whether the recommended users are on the same team as the user being provided the recommendations. Similarly, AI module 122 can narrow the search results to users actively engaged in the same or similar topics as the user being provided the search results of recommended users.

AI module 122 can provide the search results in various formats. For example, AI module 122 can provide the names of the recommended users. AI module 122 can also provide the topics that the recommended users and the current user have in common. As would be appreciated by a person of ordinary skill in the art, a system administrator or a user can customize what is shown in the recommendation list as well as the number of search results.

AI module 122 can further rank the search results based on other criteria like location, distance between users, previous interaction between users, length of time at the business or organization, or various other criteria as would be appreciated by a person of ordinary skill.

In some embodiments, server 106 can use AI module 122 to identify a community of users who are engaged in the same or similar topics (e.g., working in similar areas or facing similar challenges). AI module 122 can identify a community of users in a similar way as it identifies users engaged in the same or similar topics as a user being provided a list of recommended users. In other words, as would be appreciated by a person of ordinary skill in the art, AI module 122 can extend the 1 to N recommendation model to an N to N model. After identifying a community of users, AI module 122 can notify the community of users that they are working on the same or similar topics. AI module 122 can also notify managers in the business, organization, or entity about the community of users. This can enable the managers to determine if users are performing duplicate work or if there are users in the business, organization, or entity that are tackling similar problems.

In some embodiments, server 106 can use search engine 120 to allow a user to search database 110 for information about what they previously did. A user can provide various search terms (e.g., keywords) to search engine 120 to lookup how they performed a topic associated with the search terms in the past. In response, search engine 120 can return a data state associated with the search terms that represents how they performed the topic at a previous point in time. For example, search engine 120 can return a data state that shows how things looked on a user's screen at the previous point in time. Search engine 120 can return various data assets as part of the data state such as, but not limited to, the documents, emails, metadata, and screen data (e.g., screenshots) that match the search terms associated with the topic the user performed at the previous time in the past.

Server 106 can provide a user interface so that the user can select one or more of the data assets and view them. The user interface can allow a user to travel "back in time" and look at their screen (e.g., via captured screenshots) at the time of recording by recording module 108. In other words, the user can search for a topic they previously performed and see exactly how they performed it (e.g., what documents they were writing, what programs they had open, and or what websites they were looking at) at the time they actually performed it. The user interface can highlight the keywords inputted on the captured screen data (e.g., screenshot). The user interface can also highlight the keywords inputted in the associated metadata. The user interface can also provide clickable links to the data assets represented in the screen data. For example, this can enable the user to open the respective website again or access the PDF document that is shown in the screen data (e.g., screenshot) again. The user interface can also include references to snapshots of the files (e.g., a presentation program file) used at the time the screen data (e.g., screenshot) was taken by recording module 108 so that the user can open that version of the file again exactly as it existed at the time the screen was recorded.

In some embodiments, server 106 can also provide analytical summaries about users working on the same or similar topics. For example, server 106 can calculate the number of users working on a particular topic. Server 106 can also calculate the number of people working on a particular topic in different locations. Server 106 can provide these analytical summaries to system administrators and or managers. System administrators and or managers can use this information to make better organizational decisions.

In some embodiments, server 106 can include a privacy module 124. Because server 106 can analyze screen data capturing a visible portion of a display of client computer 102, there can be privacy concerns. For example, some of the captured information may be of a personal nature to the user of client computer 102. In addition, some of the captured information may be privileged or client confidential. In this case, the captured information may not be able to be analyzed without consent (e.g., from a client or customer). Finally, some of the captured information may not be helpful in analyzing what users are working on. To exclude this information from analysis, server 106 can include a privacy module 124 that prevents the analysis of certain captured information.

Privacy module 124 can prevent certain information from being analyzed and included in database 110. Privacy module 124 can identify private information when it is received at server 106. For example, privacy module 124 can be run prior to using OCR module 112. Privacy module 124 can check whether the received information from client computer 102 is private. For example, privacy module 124 can check whether the metadata associated with the received screen data contains private information.

In addition, privacy module 124 can be run at other times before the received information is stored in database 110. For example, privacy module 124 can analyze the extracted text from OCR module 112 to determine if the received information should be stored in database 110. Similarly, privacy module can analyze the topics identified by topic detection module 118 to determine if the topics relate to private information, and therefore whether the received information should not be stored in database 110.

Privacy module 124 can also remove received information already stored in database 110. For example, privacy module 124 can periodically scan database 110 for private information. If privacy module 124 identifies information that is private, privacy module 124 can automatically delete it from database 110.

Privacy module 124 can identify private information based on various characteristics. For example, privacy module 124 can identify private information based on user, topic, time frame, keyword, location, or various other criteria as would be appreciated by a person of ordinary skill in the art.

Figure 2:
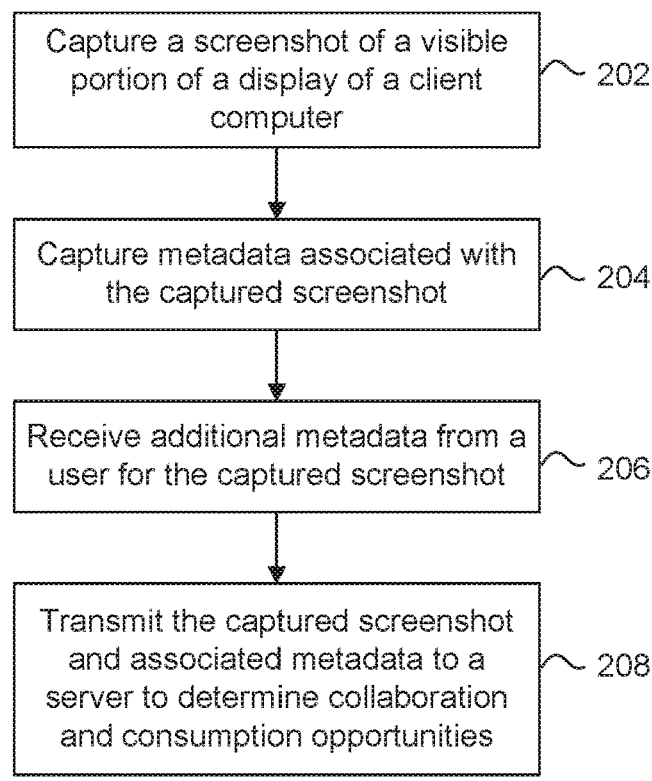
FIG. 2 is a flowchart illustrating a process for recording screen data of a visible portion of a display of a client computer for subsequent analysis of user interactions for collaboration and consumption opportunities, according to some embodiments.

FIG. 2 is a flowchart for a method 200 for recording screen data of a visible portion of a display of client computer 102 for determining collaboration and consumption opportunities, according to an embodiment. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

Method 200 shall be described with reference to FIG. 1. However, method 200 is not limited to that example embodiment.

In 202, recording module 108 captures screen data (e.g., a screenshot) of a visible portion of the display of client computer 102. Recording module 108 can capture a screen data (e.g., a screenshot) of the entire screen (or a visible portion of the screen) using an API of the operating system of client computer 102. Recording module 108 can also capture screen data corresponding to an active software application window using a software hook into the active software application. As would be appreciated by a person of ordinary skill in the art, recording module 108 can capture screen data of the entire screen (or a visible portion of the screen) using various other techniques such as copying the framebuffer associated with the display of client computer 102.

In 204, recording module 108 captures metadata associated with the captured screen data. Recording module 108 can capture any combination of:

the date and time when the screen data was captured;
the name of the user using client computer 102 when the screen data was captured;
the name of the program running in the foreground of the screen (e.g., the active software application) when the screen data was captured;
the filename and or title of the current object (e.g., a word processing document) that is visible on the screen when the screen data was captured;
the URL or title of the current website visible on the screen when the screen data was captured;
how long the information in the screen data was shown on the display of client computer 102; and/or
the type of document visible on the screen (e.g., a website, document, presentation, image, video, email, etc.) when the associated screen data was captured.

In addition, recording module 108 can capture other activity of the user at client computer 102 when the screen data was captured. For example, recording module 108 can capture whether the user was viewing information, typing on the keyword, or moving the mouse. Recording module 108 can capture other tasks the user was performing when the associated screen data was captured. For example, recording module 108 can capture whether the user was in a phone call when the associated screen data was captured. Recording module 108 can also capture what URLs, files, and or directories the user visited when the associated screen data was captured. Recording module 108 can capture various other types of information as would be appreciated by a person of ordinary skill in the art.

In 206, recording module 108 can optionally receive metadata directly from the user. For example, recording module 108 can receive annotations added to the captured screen data by the user.

In 208, recording module 108 transmits the captured screen data and associated metadata to server 106 to determine consumption and collaboration opportunities. Recording module 108 can continuously transmit the captured screen data together with their associated metadata to server 106 for processing. Recording module 108 can also wait to transmit several captured screen data items as a group to server 106 for processing.

Figure 3:
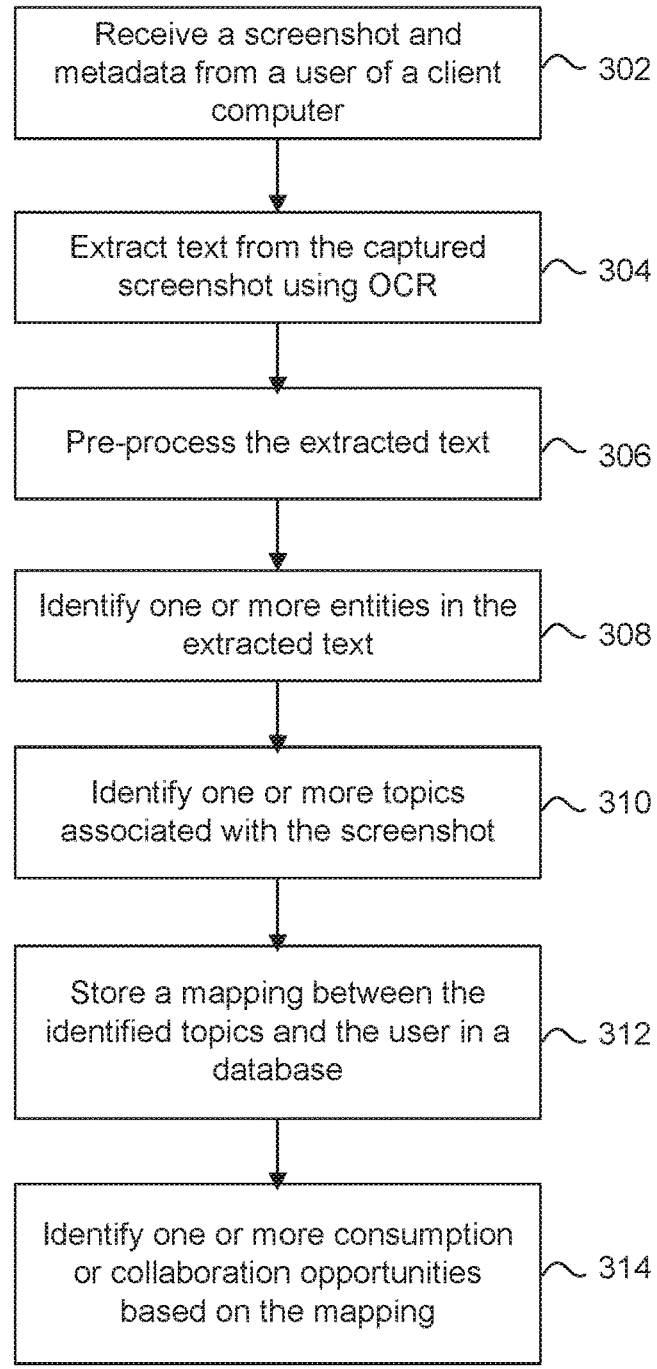
FIG. 3 is a flowchart illustrating a process for analyzing recorded screen data of user interactions to provide collaboration and consumption opportunities, according to some embodiments.

FIG. 3 is a flowchart for a method 300 for analyzing recorded screen data of user interactions to provide collaboration and consumption opportunities, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, server 106 receives screen data and associated metadata for a user from client computer 102.

In 304, server 106 can optionally extract text in the received screen data using OCR module 112. For example, if the received screen data is a screenshot of an email program displaying an email, OCR module 112 can extract the text in the displayed email. As would be appreciated by a person of ordinary skill in the art, OCR module 112 can use various optical character recognition techniques.

In 306, server 106 can optionally pre-process the extracted text outputted by OCR module 112 using pre-processor module 114. This can improve the quality of the extracted text for the later topic identification and user matching. Pre-processor module 114 can remove punctuation, special symbols, stop words, or numbers from the extracted text. Pre-processor module 114 can standardize the letter case of words. Pre-processor module 114 can autocorrect spelling errors due to OCR recognition failures. Pre-processor module 114 can remove sensitive words from the extracted text. As would be appreciated by a person of ordinary skill in the art, pre-processor module 114 can perform various other types of pre-processing.

In 308, server 106 identifies one or more entities in the extracted text (whether pre-processed or not) using entity extraction module 116. Entity extraction module 116 can identify text in the extracted text that represents certain entities (e.g., things, people, places, etc.) For example, entity extraction module 116 can identify dates, software application names, document titles, persons, Internet addresses, and email addresses in the extracted text. As part of identifying these entities, entity extraction module 116 assigns the piece of text to an associated category (e.g., a person, Internet address, etc.) This creates additional metadata beyond the metadata received with the captured screen data. Entity extraction module 116 can identify entities using various techniques as would be appreciated by a person of ordinary skill in the art.

In 310, server 106 identifies one or more topics associated with the received screen data using topic detection module 118. Topic detection module 118 can perform this identification using the extracted text from OCR module 112 (or the pre-processed text from pre-processing module 114), the metadata received with the captured screen data from client computer 102, and or the additional entity metadata received from entity extraction module 116.

In some embodiments, topic detection module 118 can identify topics associated with the captured screen data using a two-step process. In the first step, topic detection module 118 can extract a list of the most informative keywords from the extracted text from OCR module 112 (or the pre-processed text from pre-processing module 114). Topic detection module 118 can extract the list of the most informative keywords using a term frequency-inverse document frequency technique. As would be appreciated by a person of ordinary skill in the art, topic detection module 118 can extract the list of the most informative keywords using various other numerical statistical methods. The result of the first step is a list of the most meaningful keywords for the extracted text, and therefore for the captured screen data.

In the second step, topic detection module 118 can identify clusters of keywords from the first step that are representative of the topics. Topic detection module 118 can identify clusters of keywords that are representative of the topics using a induced bisection k-means algorithm. As would be appreciated by a person of ordinary skill in the art, topic detection module 118 can identify clusters of keywords that are representative of the topics using various other algorithms that calculate similarity or distance between words. Topic detection module 118 can then output the one or more identified topics for the extracted text.

In 312, server 106 stores a mapping between the identified one or more topics and the user in a database 110. For example, server 106 stores the identified topics for the extracted text together with information about the user associated with the received screen data, the received screen data itself, the received metadata associated with the screen data screenshot from client computer 102, and or the metadata generated at server 106 (e.g., the entity metadata) in database 110.

In 314, server 106 identifies consumption and or collaboration opportunities based on the mapping of 312. In other words, server 106 identifies consumption and or collaboration opportunities using the knowledge about users in database 110. In some embodiments, server 106 can provide a list of users who are engaged in the same or similar topics as the user who is submitting a search request to server 106.

In some embodiments, server 106 can use AI module 122 to provide recommendations to a user of user who are engaged in the same or similar topics as a user without requiring the user to specifically issue a search request. In some embodiments, server 106 can identify a community of users who are working the same or similar topics. In some embodiments, server 106 can provide a list of users who work on a particular topic in response to a search request from a user for users working on that topic. In some embodiments, server 106 can provide a user the ability to see how their screen looked at the time of screen recording when they were engaged in a particular topic. In some embodiments, server 106 can provide analytical summaries about users working on the same or similar topics to managers and system administrators.

Figure 4:
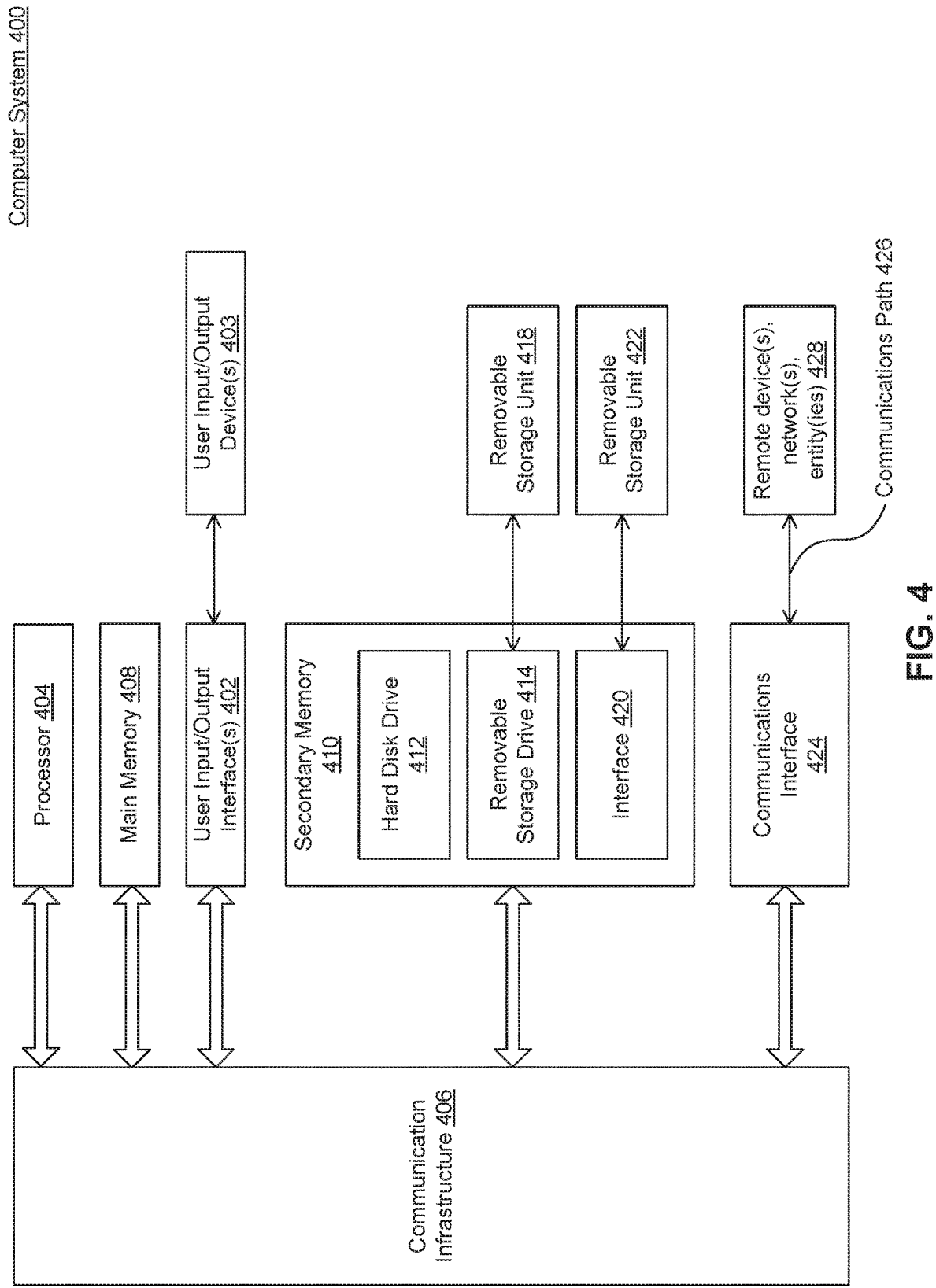
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for analyzing screen data to provide collaboration and consumption opportunities, comprising:

detecting an indication that a first user needs help with a document being accessed by the first user via a first client computer;

receiving, by at least one processor, a screenshot of a visible portion of a display of the first client computer at a time point and metadata comprising the indication that the user needs help with the document, wherein the screenshot is captured by the first client computer, and the screenshot and the metadata are associated with the first user;

extracting, by the at least one processor, text from the screenshot using optical character recognition;

determining, by the at least one processor, a topic for the screenshot using the extracted text;

storing, by the at least one processor, a data item in a database, wherein the data item comprises a mapping between the determined topic and the first user, the screenshot, and the metadata associated with the screenshot;

identifying, responsive to the detecting the indication that the first user needs help with the document, one or more other users who are engaged in the determined topic by an artificial intelligence module, based on interactions by the one or more other users with the document; and providing, by the at least one processor, a list of the identified one or more other users who are engaged in the determined topic and who have interacted with the document responsive to the detecting the indication that the first user needs help with the document.

2. The method of claim 1, wherein the metadata comprises at least one of a date and time of the screenshot, a name of the first user, a name of a program running in a foreground on the display of the first client computer, a filename or title of a current document visible on the display of the first client computer, current activity of the first user, or an annotation associated with the screenshot.

3. The method of claim 1, further comprising:
removing at least one of punctuation, special symbols, stop words, sensitive words, and numbers from the extracted text.

4. The method of claim 1, further comprising:
extracting an entity from the extracted text; and
storing the entity in the metadata.

5. The method of claim 1, wherein the determining further comprises:
extracting a list of informative keywords from the extracted text;
identifying a cluster of keywords from the list of informative keywords; and
determining the topic using the cluster of keywords.

6. The method of claim 1, wherein the providing further comprises:
determining a second topic associated with a second user is equivalent to the determined topic based on the mapping between the determined topic and the first user; and
providing the screenshot and the metadata associated with the screenshot to the second user based on the determining.

7. The method of claim 1, wherein the providing further comprises:
receiving a second topic from a second user; and
determining the first user is associated with the second topic based on the mapping between the determined topic and the first user.

8. The method of claim 5, wherein the extracting the list of informative keywords further comprises:
extracting the list of informative keywords from the extracted text using a term frequency-inverse document frequency technique.

9. The method of claim 5, wherein the determining the topic using the cluster of keywords further comprises:
identifying the cluster of keywords from the list of informative keywords using an induced bisection k-means algorithm.

10. The method of claim 1, further comprising:
receiving, by the at least one processor, from a second user at the second client computer, a search request for a list of users engaging in a same or similar topic as the second user; and
wherein the providing the screenshot and the metadata associated with the screenshot to the second user further comprises:
providing, by the at least one processor, the screenshot and the metadata associated with the screenshot to the second user at the second client computer based on the search request.

11. The method of claim 1, wherein the providing comprises:
providing the first user access to a recording of a screen of a second user of the identified one or more other users who are engaged in the determined topic at a time when they were engaged in the determined topic.

12. The method of claim 1, wherein the identifying comprises identifying a subset of the one or more other users who are previously identified as experts in the determined topic based on the subset of the one or more users having created information on the determined topic.

13. A system, comprising:
a memory; and
at least one processor coupled to the memory and configured to:
detect an indication that a first user needs help with a document being accessed by the first user via a first client computer;
receive a screenshot of a visible portion of a display of the first client computer at a time point and metadata comprising the indication that the user needs help with the document, wherein the screenshot is captured by the first client computer, and the screenshot and the metadata are associated with the first user;
extract text from the screenshot using optical character recognition;
determine a topic for the screenshot, using the extracted text;
store a data item in a database, wherein the data item comprises a mapping between the determined topic and the first user, the screenshot, and the metadata associated with the screenshot;
identify, responsive to the detecting the indication that the first user needs help with the document, one or more other users who are engaged in the determined topic by an artificial intelligence module, based on interactions by the one or more other users with the document; and
provide a list of the identified one or more other users who are engaged in the determined topic and who have interacted with the document responsive to the detecting the indication that the first user needs help with the document.

14. The system of claim 13, wherein the metadata comprises at least one of a date and time of the screenshot, a name of the first user, a name of a program running in a foreground on the display of the first client computer, a filename or title of a current document visible on the display of the first client computer, current activity of the first user, or an annotation associated with the screenshot.

15. The system of claim 13, the at least one processor further configured to:

remove at least one of punctuation, special symbols, stop words, sensitive words, and numbers from the extracted text.

16. The system of claim 13, the at least one processor further configured to:
   extract an entity from the extracted text; and
   store the entity in the metadata.

17. The system of claim 13, wherein to determine the topic for the screenshot, the at least one processor is further configured to:
   extract a list of informative keywords from the extracted text;
   identify a cluster of keywords from the list of informative keywords; and
   determine the topic using the cluster of keywords.

18. The system of claim 13, wherein to provide the screenshot and the metadata associated with the screenshot to a second user, the at least one processor is further configured to:
   determine a second topic associated with the second user is equivalent to the determined topic based on the mapping between the determined topic and the first user; and
   provide the screenshot and the metadata associated with the screenshot to the second user based on the determining.

19. The system of claim 13, wherein to provide the screenshot and the metadata associated with the screenshot to a second user, the at least one processor is further configured to:
   receive a second topic from the second user; and
   determine the first user is associated with the second topic based on the mapping between the determined topic and the first user.

20. A non-transitory computer-readable medium having instructions stored thereon that, when executed by at least one computing device, cause the at least one computing device to perform operations comprising:
   detecting an indication that a first user needs help with a document being accessed by the first user via a first client computer;
   receiving a screenshot of a visible portion of a display of the first client computer at a time point and metadata comprising the indication that the user needs help with the document, wherein the screenshot is captured by the first client computer, and the screenshot and the metadata are associated with the first user;
   extracting text from the screenshot using optical character recognition;
   determining a topic for the screenshot using the extracted text;
   storing a data item in a database, wherein the data item comprises a mapping between the determined topic and the first user, the screenshot, and the metadata associated with the screenshot;
   identifying, responsive to the detecting the indication that the first user needs help with the document, one or more other users who are engaged in the determined topic by an artificial intelligence module, based on interactions by the one or more other users with the document; and
   providing a list of the identified one or more other users who are engaged in the determined topic and who have interacted with the document responsive to the detecting the indication that the first user needs help with the document.

21. The non-transitory computer-readable medium of claim 20, wherein the metadata comprises at least one of a date and time of the screenshot, a name of the first user, a name of a program running in a foreground on the display of the first client computer, a filename or title of a current document visible on the display of the first client computer, current activity of the first user, or an annotation associated with the screenshot.

22. The non-transitory computer-readable medium of claim 20, the operations further comprising:
   extracting an entity from the extracted text; and
   storing the entity in the metadata.

23. The non-transitory computer-readable medium of claim 18, the determining further comprising:
   extracting a list of informative keywords from the extracted text;
   identifying a cluster of keywords from the list of informative keywords; and
   determining the topic using the cluster of keywords.

* * * * *